US007977563B2

(12) United States Patent
Fukushima et al.

(10) Patent No.: US 7,977,563 B2
(45) Date of Patent: Jul. 12, 2011

(54) OVERDUBBING DEVICE

(75) Inventors: Hiroki Fukushima, Tokorozawa (JP);
Shigeyuki Adachi, Kodaira (JP)

(73) Assignee: TEAC Corporation, Tama-shi, Tokyo (JP)

( * ) Notice: Subject to any disclaimer, the term of this patent is extended or adjusted under 35 U.S.C. 154(b) by 111 days.

(21) Appl. No.: 12/350,162

(22) Filed: Jan. 7, 2009

(65) Prior Publication Data

US 2009/0178541 A1 Jul. 16, 2009

(30) Foreign Application Priority Data

Jan. 15, 2008 (JP) ................................. 2008-005589

(51) Int. Cl.
*G10H 1/08* (2006.01)
(52) U.S. Cl. ........................................................ 84/625
(58) Field of Classification Search ................... 84/625, 84/477 R; 386/124
See application file for complete search history.

(56) References Cited

U.S. PATENT DOCUMENTS

| 4,754,680 | A | 7/1988 | Morikawa et al. | |
| 6,563,038 | B2 * | 5/2003 | Kikuchi | ......................... 84/610 |
| 7,212,469 | B2 | 5/2007 | Hirade et | |
| 2002/0189426 | A1 | 12/2002 | Hirade | |
| 2004/0091126 | A1 | 5/2004 | Hirade | |
| 2007/0025568 | A1* | 2/2007 | Aiso et al. | ..................... 381/119 |
| 2007/0162167 | A1* | 7/2007 | Ae | ................................... 700/94 |
| 2008/0124056 | A1* | 5/2008 | Concotelli | .................... 386/124 |
| 2008/0271589 | A1* | 11/2008 | Lemons | ..................... 84/477 R |
| 2009/0178541 | A1 | 7/2009 | Fukushima et al. | ............ 84/609 |
| 2009/0178545 | A1 | 7/2009 | Fukushima et al. | ............ 84/625 |

FOREIGN PATENT DOCUMENTS

| JP | 7-85593 A | 3/1995 |
| JP | 8-287610 A | 11/1996 |
| JP | 2000-3178 A | 1/2000 |
| JP | 2003-66999 A | 3/2003 |
| JP | 2003-280664 A | 10/2003 |
| JP | 2004-157260 A | 6/2004 |
| JP | 2006-11191 A | 1/2006 |

* cited by examiner

*Primary Examiner* — Jianchun Qin
(74) *Attorney, Agent, or Firm* — Seed IP Law Group PLLC

(57) ABSTRACT

A CPU of an overdubbing device plays back a music file recorded in a memory card of the device and outputs the file as a played-back audio signal while mixing the played-back audio signal with an external audio signal input from the outside, to thus perform overdubbing. A music file recorded through overdubbing last time is automatically set as a playback music file for the next time, and a selected state of means for selecting execution/nonexecution of overdubbing is maintained as the state of execution. As a result, overdubbing is enabled by twice operations of a record key, whereby the operation is made identical with operation performed during ordinary recording. Further, playback is performed by changing either playback speed or musical interval of the playback music file.

4 Claims, 5 Drawing Sheets

OVERDUBBING DEVICE

PRIORITY INFORMATION

This application claims priority to Japanese Patent Application No. 2008-005589 filed on Jan. 15, 2008 which is incorporated herein by reference in its entirety.

BACKGROUND

1. Technical Field

The present invention relates to an overdubbing device and, more particularly, to a device that plays back a recorded music file, to thus output a played-back audio signal, and that records the played-back audio signal while mixing it with an external audio signal input from the outside.

2. Related Art

There has hitherto been put forward an overdubbing apparatus that plays back a recorded music file, to thus output a played-back audio signal, and that records the played-back audio signal while mixing it with an external audio signal input from the outside.

For instance, JP 7-85593 A discloses an overdubbing function of reading audio data recorded in a recorder and writing mixed audio data back into the recorder by use of a buffer.

JP 2003-66999 A discloses an overdubbing function of mixing an audio signal input from a microphone with an MP3 audio signal of a source file in a memory card, storing a resultant mix as a mixed file in the memory card, and utilizing the mixed file as a new source file from the next time.

JP 2004-157260 A discloses an overdubbing function of repeating operation for mixing an input audio signal with a source file in a memory card, to thus create a first mixed file, and mixing the first mixed file taken as a new source file with an input audio signal, to thus create a second mixed file.

Moreover, JP 2006-11191 A describes a device having a musical performance control unit that merges music output from a synthesizer with voice input from a microphone and outputs the resultant and a game control unit that controls a game in accordance with operation of a remote controller in parallel with control of musical performance. In accordance with a result of evaluation made by a game evaluation unit, at least either the speed or voice of music is changed.

However, the related-art device encounters problems stemming from complication of operation, such as a necessity for operation for manually selecting a source music file (a source file) used when overdubbing is performed, a necessity for special key operation for performing overdubbing (e.g., a MIX key). In particular, when overdubbing is repeatedly performed, it is necessary to repeatedly perform the special operations; hence, complication becomes noticeable.

At the time of overdubbing operation, there are many desires to change a musical interval or playback speed of a source file to achieve synchronism with the musical interval and speed of an external audio input to be overdubbed. However, such a request cannot have been fulfilled in the related art. As a matter of course, it is easy to change playback speed by changing a sampling frequency. However, since playback and recording are simultaneously performed during overdubbing operation, the sampling frequency cannot be changed. A technique for changing only a musical interval or playback speed is employed in a karaoke machine, and the like, but overdubbing is not carried out. Further, when overdubbing for practicing a musical instrument, and the like, is performed, there are many desires to mute sound of the musical instrument included in a source file and overdub the file with sound played by a user. The related-art devices encounter a problem of a failure to meet such a variety of editorial requests.

The present invention provides a device that enables performance of overdubbing operation by simple operation and that enables edition at the time of overdubbing operation.

SUMMARY

The present invention provides a device that performs overdubbing by simple operation; particularly, a device that enables considerable enhancement of user's operability when overdubbing is repeatedly performed.

An overdubbing device of the present invention plays back a recorded music file, outputs a played-back audio signal, and records the played-back audio signal while mixing the played-back audio signal with an external audio signal input from the outside. The device of the present invention has a setting unit that sets a recorded music file as a playback music file for the next time; a selection unit that is a unit for selecting execution/nonexecution of overdubbing and that maintains a selected state of execution of overdubbing when overdubbing was performed last time; a recording unit that plays back the playback music file in response to operation of a record key and a state of the selection unit, to thus perform overdubbing; and a change unit that changes playback conditions employed at the time of playback of the playback music file.

In an embodiment of the present invention, the change unit changes at least playback speed or a musical interval employed when the playback music file is played back.

In another embodiment of the present invention, the change unit eliminates a specific audio signal included in the playback music file when the playback music file is played back.

The present invention makes it possible to perform overdubbing by simple operation and edition at the time of overdubbing operation.

The invention will be more clearly comprehended by reference to the embodiment provided below. However, the following embodiment is a mere illustration, and the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the present invention will be described hereunder by reference to the drawings.

An overdubbing device of the present embodiment is a portable overdubbing device; specifically, a stereo overdubbing device having a built-in microphone. The portable overdubbing device has various operation keys. The operation keys include a record key (a REC key), a key for playing back a recorded music file (a PLAY key), a key for stopping recording/playing back operation (a STOP key), a menu key for activating a menu, a dial key for performing settings or changing, and others. Further, the portable overdubbing device has a display, such as an LCD and an organic EL, and displays various setting conditions and recording/playing-back conditions.

Figure 1:
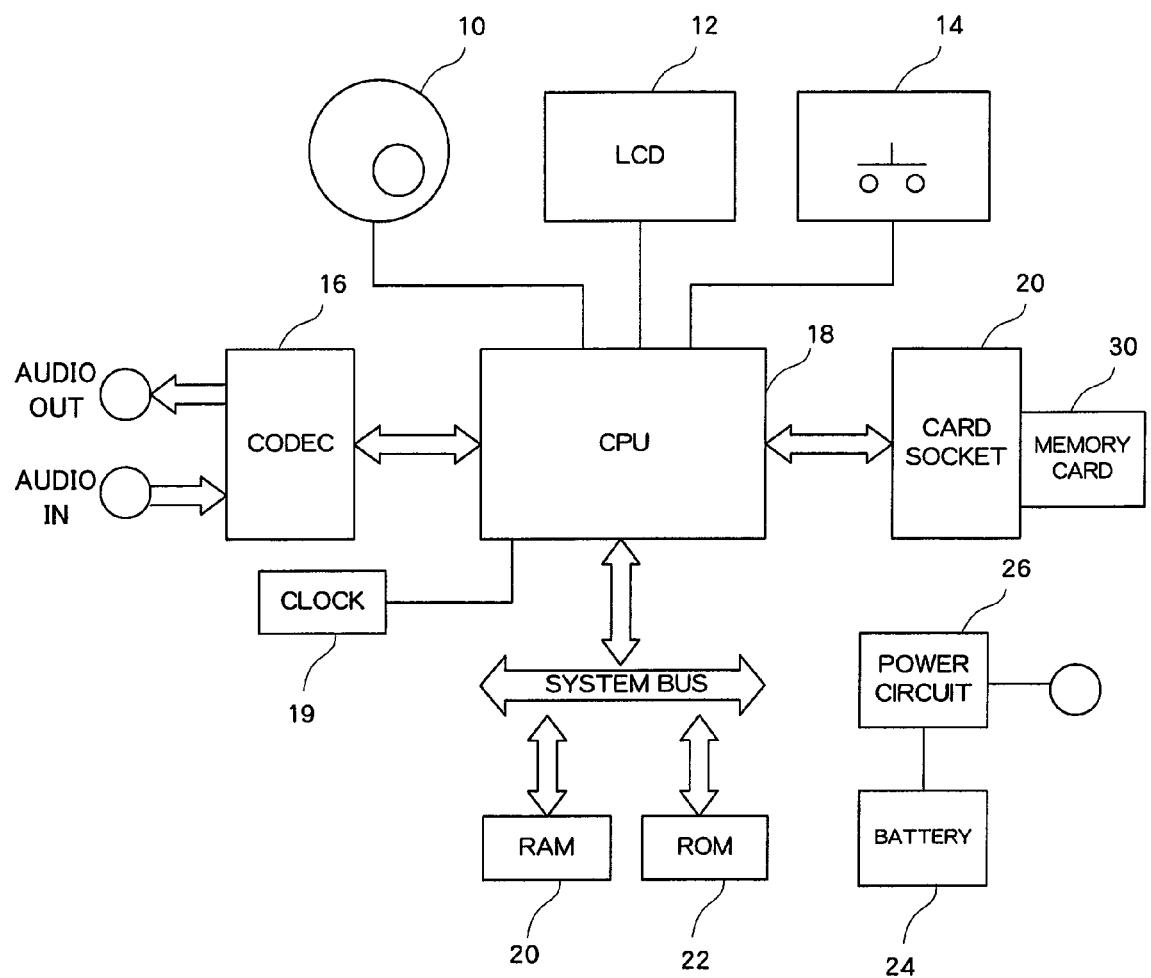
FIG. 1 is a block diagram showing the configuration of a portable overdubbing device of an embodiment.

FIG. 1 shows a block diagram showing the configuration of a portable overdubbing device. A dial key 10, an LCD 12, an operation key 14 are provided on the front of the device. The dial key 10 is for selecting a music file to be played back and selecting whether or not to perform overdubbing. The operation key 14 includes the record key, the playback key, the stop key, and the menu key as mentioned previously. The operation key 14 may also additionally include a key for controlling playback speed or a musical interval or a key for eliminating specific sound. A key for eliminating specific sound is made up of; for instance, a key for specifying the type of a musical instrument. An operation signal from the dial key 10 and the operation key 14 is supplied to a CPU 18.

Figure 8:
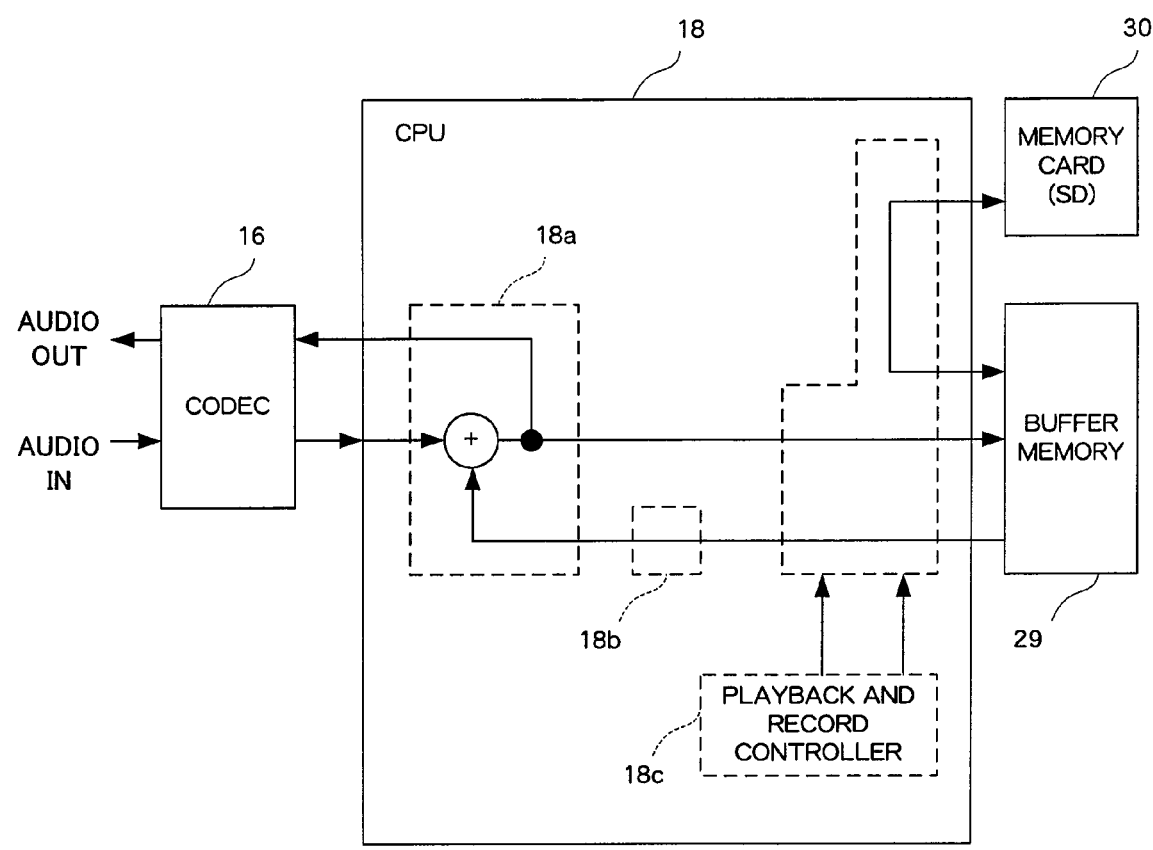
FIG. 8 is a block diagram showing the internal configuration of a CPU.

An audio signal from the outside is input to an input terminal (AUDIO IN) and supplied to a codec (CODEC) 16. The codec 16 converts the external audio signal into a digital signal, to thus encode the signal, and supplies the thus-encoded signal to the CPU 18. The CPU 18 writes the external audio signal data as a music file into a memory card 30 loaded in a card socket 28. The data may also be compressed as an MP3 file. The CPU 18 operates by means of a clock signal from a system clock 19 and performs signal processing by using RAM 20 as working memory in accordance with a program previously stored in ROM 22. In particular, the CPU 18 stores a state of execution/nonexecution of overdubbing in the RAM 20. In a default state achieved immediately after activation of power, there is a state of nonexecution of overdubbing, and a user operates the operation key 14, thereby arbitrarily selecting execution or nonexecution of overdubbing. The CPU 18 stores the currently-selected state in the RAM 20. The CPU 18 also reads a music file recorded in the memory card 30 and supplies the file to the codec 16. The codec 16 decodes the music file, converts the thus-decoded file into an analog signal, and outputs the signal from an output terminal (AUDIO OUT). During overdubbing operation, a music file recorded in the memory card 30 is played back; mixed with an external audio signal, such as music of the guitar, vocals, and the like, input from the input terminal; and output as a music signal. The CPU 18 writes the thus-mixed music signal data as a music file into the memory card 30. When written into the memory card 30, the music file is imparted with a file name different from that of the played-back music file (a source file). FIG. 8 shows a functional block diagram of the CPU 18. The music file played back from the memory card 30 is stored in the buffer memory 29 and supplied to a mixing unit 18a of the CPU 18. The mixing unit 18a captures the external audio signal; adds the thus-captured signal to the played-back music signal; supplies the thus-added signal to the codec 16 and outputs as a music signal; stores the signal into the buffer memory 29; and further writes the signal into the memory card 30. In addition to including the mixing unit 18a, the CPU 18 has a part cancellation unit 18b for removing a specific signal included in the played-back music signal and a controller 18c for controlling a playback speed achieved during playing-back and recording operation.

The respective units of the portable overdubbing device operate upon receipt of power supply from a battery 24. The battery 24 becomes recharged by means of power from a power circuit 26.

In such a configuration, the CPU 18 selectively performs recording (normal recording), overdubbing, and playback in accordance with operation of the operation key 14. However, when overdubbing is performed, a music file to be played back is first selected by operating the dial key 10; a selection as to whether or not to perform overdubbing is made; and the record key is operated. Thus, operations are intricate. Therefore, the CPU 18 of the present embodiment performs processing provided below to simplify user's operation required during overdubbing. First, when recording or overdubbing is performed, a recorded music file is automatically set as a music file for the next playback. When the music file is automatically set as a playback music file for the next time, the user does not need to select a music file (a source file) to be played back when the user performs overdubbing operation next time. "Automatic setting" means setting a default playback state for the music file or setting the music file in a playback standby state. The playback standby state means that a music file is automatically played back when a key is operated next time. Second, when overdubbing is performed, the state of execution/nonexecution of overdubbing is held, as it is, in the state of execution. Operability is considerably enhanced by performing these processing operations. Specifically, when overdubbing is repeated, a music file recorded by previous execution of overdubbing is automatically set as a playback music file, thereby saving the user from selecting a source file. Moreover, the state of execution of overdubbing is held as it is, which saves the user from again selecting execution of overdubbing. As a result of the efforts being saved, even when repeatedly performing overdubbing, the essential requirement for the user is to perform only the same operation as that performed during normal recording operation.

Figure 2:
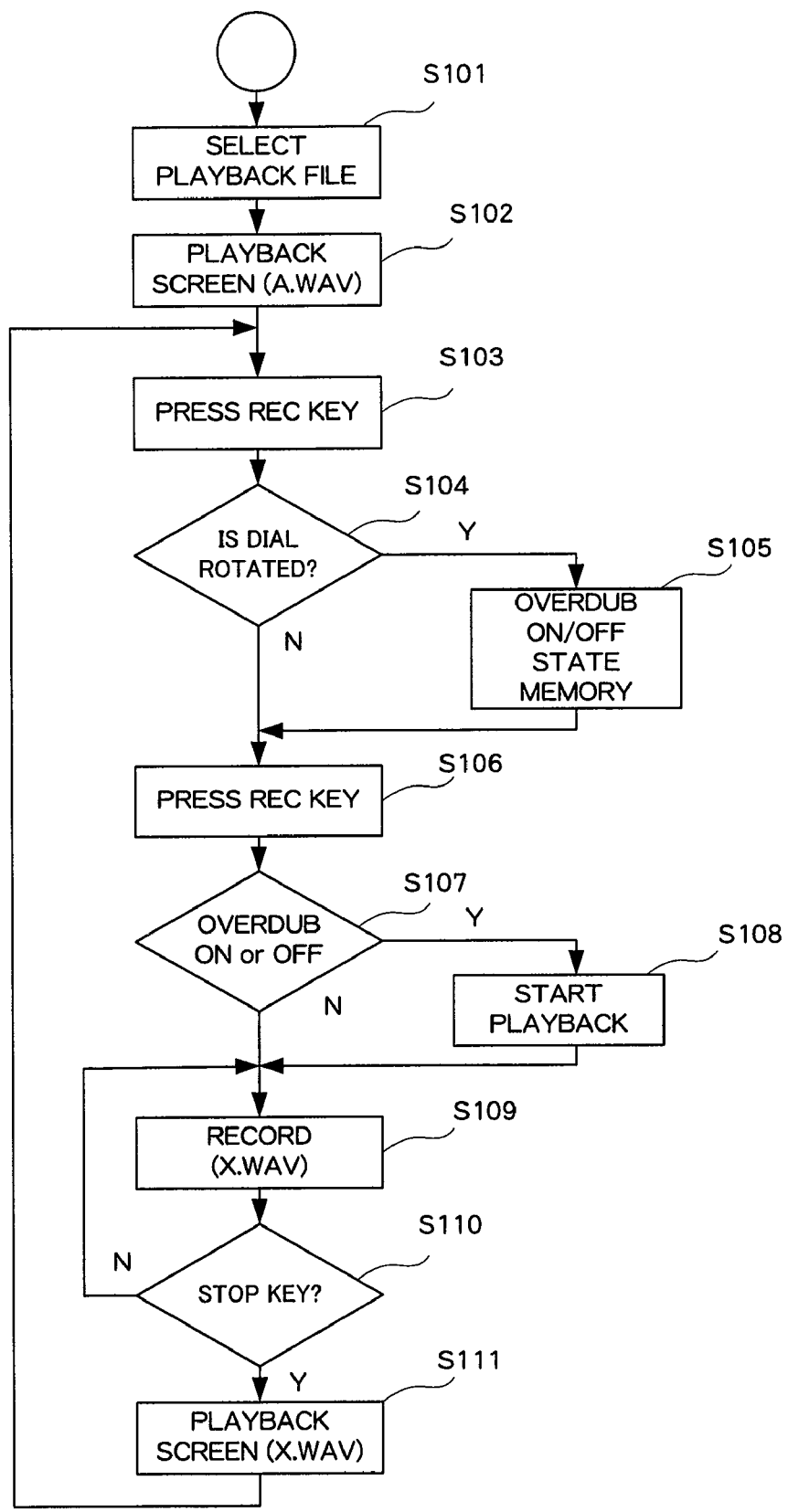
FIG. 2 is a processing flowchart of the embodiment.
Figure 3:
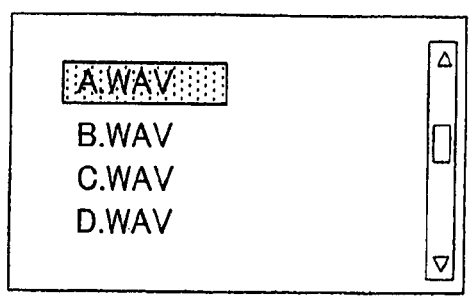
FIG. 3 is a view showing a screen display for selecting a file to be played back.
Figure 4:
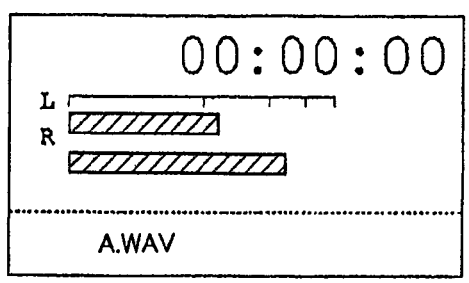
FIG. 4 is a view showing a playback screen display.
Figure 5:
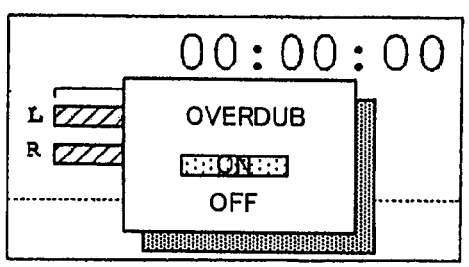
FIG. 5 is a view showing a screen for selecting whether or not to perform overdubbing.

FIG. 2 shows a processing flowchart of the present embodiment. First, the user operates the dial key 10 to select a music file to be played back (S101). FIG. 3 shows an example playback file selection screen displayed on the LCD 12 by the CPU 18. The example is a case where four music files are recorded in the memory card 30. An "A.WAV" file among the four music files is highlighted, showing that the file is currently selected. When selection of a playback music file is completed, the CPU 18 then displays a playback screen on the LCD 12 (S102). FIG. 4 shows an example of a playback screen displayed on the LCD 12 by the CPU 18. The name of a file to be played back is displayed along with a time indication. The playback screen shows a file remaining in a playback standby state, and the drawing shows that the selected "A.WAV" file is in a playback standby state. When the record key (REC key) is operated in this state (first operation of the record key: S103), processing proceeds to a record standby state. The CPU 18 determines whether or not the dial key 10 is operated in the record standby state (S104). Overdubbing is set in a nonexecution mode in a default state achieved immediately after activation of power. At the time of first overdubbing, execution of overdubbing must be selected; hence, the user operates the dial key 10 to select execution of overdubbing. When execution of overdubbing is selected, the CPU 18 stores the state in the RAM 20 and maintains the state until a change is made to the current state (S105). FIG. 5 shows an example screen for selecting execution/nonexecution of overdubbing. Execution (ON)/nonexecution (OFF) of overdubbing (OVERDUB) is displayed, and execution is highlighted, to thus show that execution is currently selected.

Figure 6:
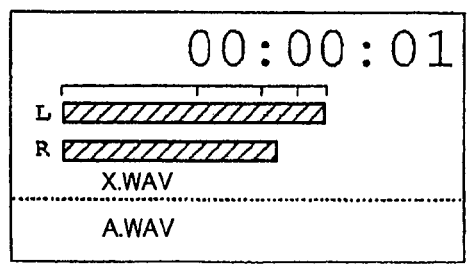
FIG. 6 is a view showing a screen display appearing during overdubbing.

When the user again operates the record key (REC key) in this state (second operation of the record key: S106), the CPU 18 determines whether the state of overdubbing is execution or nonexecution (S107). Since the state of overdubbing is stored in the RAM 20 and set to execution, a determination is made as YES, and overdubbing is commenced. Specifically, the CPU 18 reads the selected "A.WAV" file from the memory card 30; plays back the file; and outputs a played-back signal as a played-back music signal from an output terminal (S108). The played-back signal is mixed with an external audio signal by a mixing unit 18a in the CPU 18. The thus-mixed music signal data are written in the memory card 30 as a music file with another filename; for instance, "X.WAV" (S109). FIG. 6 shows an example screen appearing during overdubbing operation. A file name of a music file (a source file) being played back and a file name of an overdubbed music file are displayed along with a time indication. Overdubbing is performed until the user operates the stop key. Nonexecution of overdubbing, which is the default state achieved immediately after activation of power, is kept unless the user operates the dial key 10. In S107, the CPU 18 determines that overdubbing is in a nonexecution state and only performs recording of the external audio signal without playing back the "A.WAV" file.

Figure 7:
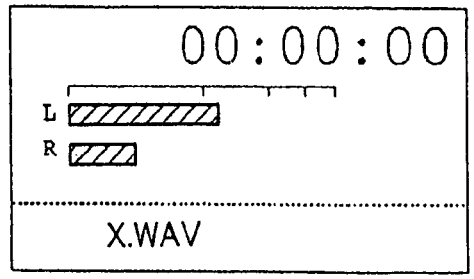
FIG. 7 is a view showing a playback screen display appearing at the end of overdubbing.

When the user operates the stop key (S110), the CPU 18 stops overdubbing operation and again displays the playback screen on the LCD 12 (S111). FIG. 7 shows an example playback screen. A file name of the music file "X.WAV" recorded in the memory card 30 by means of overdubbing is displayed, and the file is set in a playback standby state. It should be noted that the "X.WAV" file is set in a playback standby state in spite of the fact that the user did not perform operation for selecting a file. Processing pertaining to S103 and subsequent steps is repeated.

When the user operates the record key (REC key) in this state, the CPU 18 determines whether or not the dial key 10 is operated (S104). Since execution of overdubbing has already been selected by previous operation of the dial key 10 and the state is maintained, the user does not need to operate the dial key 10 when performing overdubbing again. When the user further operates the record key (REC key) in this state (S106), the CPU 18 again determines the state of execution/nonexecution of overdubbing (S107); makes a determination as YES; and starts playing back a music file (S108). The file played back at this time is the "X.WAV" file set in the playback standby state in S111.

In the meantime, when the user performs normal recording operation rather than overdubbing operation, the user operates the record Key, to thus shift the device to a record standby state. After confirming that overdubbing is set in a nonexecution state (the nonexecution state is selected by operating the dial key 10 when overdubbing is set in an execution state), the record key is again operated, to thus perform recording.

As mentioned above, at the time of first overdubbing, execution of overdubbing must be selected by operating the dial key 10. However, when overdubbing is repeatedly performed, the state of execution/nonexecution of overdubbing is maintained as-is; hence, the user does not need to operate the dial key 10 anew. Moreover, since the music file recorded through previous overdubbing is automatically set in the playback standby state, the user does not need to select the source file at the time of execution of overdubbing. As is seen from the flowchart shown in FIG. 2, operation to be performed when second or subsequent overdubbing operation is carried out includes only operation of the record key (REC key) performed in S103 and operation of the record key (REC key) performed in S106. These operations are totally identical with the operations performed during ordinary recording that is not overdubbing. Specifically, when repeatedly performing overdubbing, the user performs operations that are completely identical with those performed for ordinary recording operation.

Figure 9:
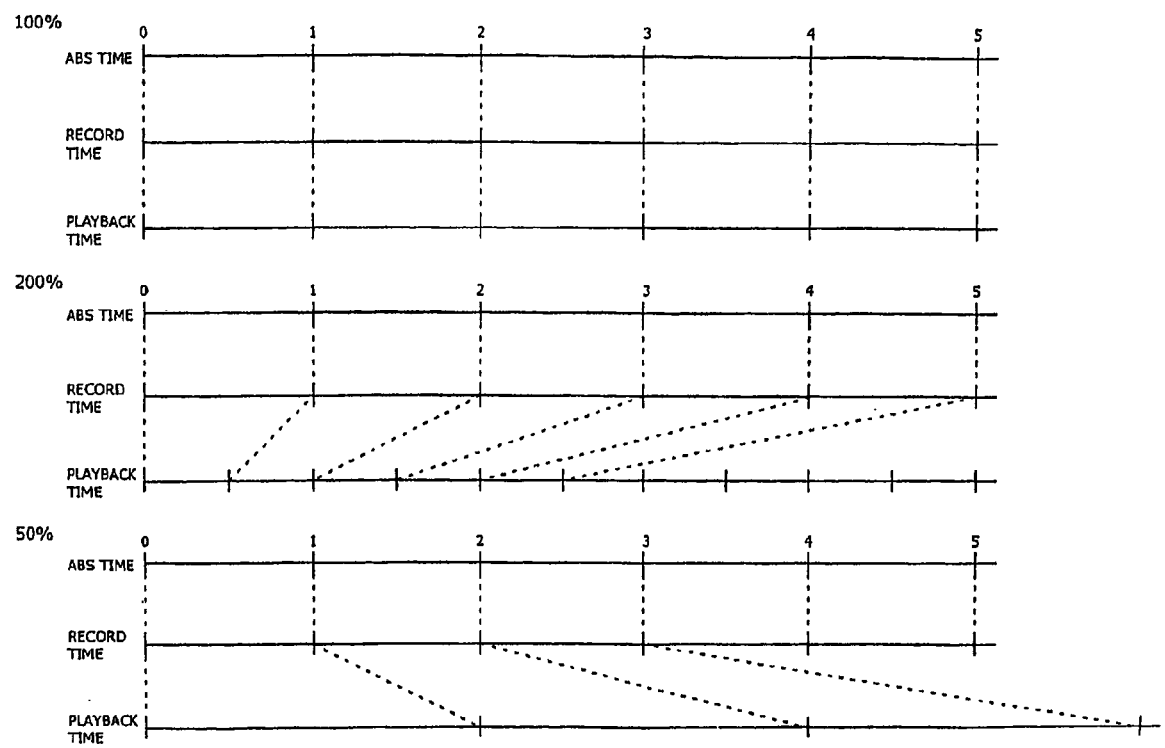
FIG. 9 is a timing chart employed when a change is made to playback speed.

In the meantime, when a change is made to conditions for playing back a music file (a source file) to be played back during overdubbing; for instance, at least either a musical interval or playback speed, the user operates the operation key 14 prior to operating the record key in S103, thereby controlling the musical interval or playback speed. For instance, the operation key 14 is operated after selection of a playback file in S101, thereby controlling a musical interval or playback speed. In accordance with a signal from the operation key 14, the CPU 18 controls the musical interval or playback speed of the music file by means of the controller 18c and outputs the musical interval or playback speed. A technique for changing a musical interval or playback speed is already known in connection with the karaoke machine, and the like, and as time stretch processing (processing for changing only playback speed without changing a musical interval). Time stretch processing includes a method for detecting a silent interval and changing a tempo without changing a pitch by adjusting the duration of the interval, a method for slicing a waveform from a phrase by use of a trapezoidal window, and the like. Time stretch processing is disclosed in; for instance, JP 8-287610 A, JP 2000-3178 A, JP 2003-280664 A, and the like. Specifically, JP 2000-3178 A describes time stretch processing for dividing an input signal into a plurality of bands by use of a filter; converting signals of respective bands into amplitude components and frequency components; changing the speed of hourly variations in the components in accordance with an amount commanded by a command unit; and combining the components together, to thus subject the input signal to time stretching. FIG. 9 shows a relationship included in a timing chart (an absolute time ABSTIME, a record time RECORDTIME, and a playback time PLAYBACKTIME) achieved when a change is made to playback speed. Reference numeral 100% designates normal playback speed; 200% designates playback speed that is double the normal playback speed (double-speed playback); and 50% designates one-half playback speed (half-speed playback). The absolute time (a real time) matches a record time regardless of playback speed. Needless to say, playback speed and a musical interval can be simultaneously adjusted. The user can perform overdubbing operation while adjusting at least one of the musical interval and playback speed of the source file to a desired musical interval or playback speed. In the present embodiment, a device for adjusting at least a musical interval or playback speed is identical with a device that performs overdubbing. Moreover, when there is a desired for elimination of a specific audio signal included in a music file to be played back (a source file) during overdubbing operation; for instance, an audio signal pertaining to the guitar, the user operates the operation key 14 prior to operation pertaining to S103. In accordance with a signal from the operation key 14, the part cancellation unit 18b of the CPU 18 extracts and eliminates a specific audio signal included in the music file on the basis of a frequency. Since sound of each of musical instruments has a unique frequency, it is possible to selectively extract and eliminate only the sound of a specific musical instrument. Subsequent operations are the same as those described previously. Thereby, only the audio signal of a specific musical instrument included in the source file; for instance, the audio signal of the guitar, can be eliminated, to thus overdub the source file with sound of the guitar played by the user. Thus, the practice of the guitar, or the like, can be effectively carried out. So long as control values, such as playback speed and a musical interval, and the state of elimination of an audio signal of a specific musical instrument are maintained without modifications, operations performed when overdubbing is repeated are also simplified. In particular, only the sound played by the user is repeatedly overdubbed during practice of a musical instrument, and the like, the advantage can be said to be considerably great.

What is claimed is:

1. An overdubbing device comprising:
   a setting unit configured to set a recorded music file as a playback music file;
   a selection unit configured to select an overdubbing state and configured to maintain the overdubbing state when overdubbing was previously selected;
   a change unit configured to change playback conditions employed at the time of playback of the playback music file based on an operation of an operation key and the overdubbing state, the operation key being configured to select the playback conditions; and
   a recording unit configured to play back the playback music file in response to operation of a record key and the overdubbing state in accordance with the playback conditions set by the change unit, to thus perform overdubbing with an external input signal.

2. The overdubbing device according to claim 1, wherein the change unit is configured to change at least playback speed or a musical interval employed when the playback music file is played back.

3. The overdubbing device according to claim 1, wherein the change unit is configured to eliminate a specific audio signal included in the playback music file when the playback music file is played back.

4. The overdubbing device according to claim 1, wherein the change unit is configured to eliminate an audio signal of a specific musical instrument included in the playback music file when the playback music file is played back.

* * * * *